Oct. 30, 1951     E. RHEINFRANK     2,573,490
DEMONSTRATOR

Filed April 28, 1950     6 Sheets-Sheet 1

INVENTOR
EUGENE RHEINFRANK
BY
Roy C. Hackley Jr.
ATTORNEY

Oct. 30, 1951   E. RHEINFRANK   2,573,490
DEMONSTRATOR
Filed April 28, 1950   6 Sheets-Sheet 2
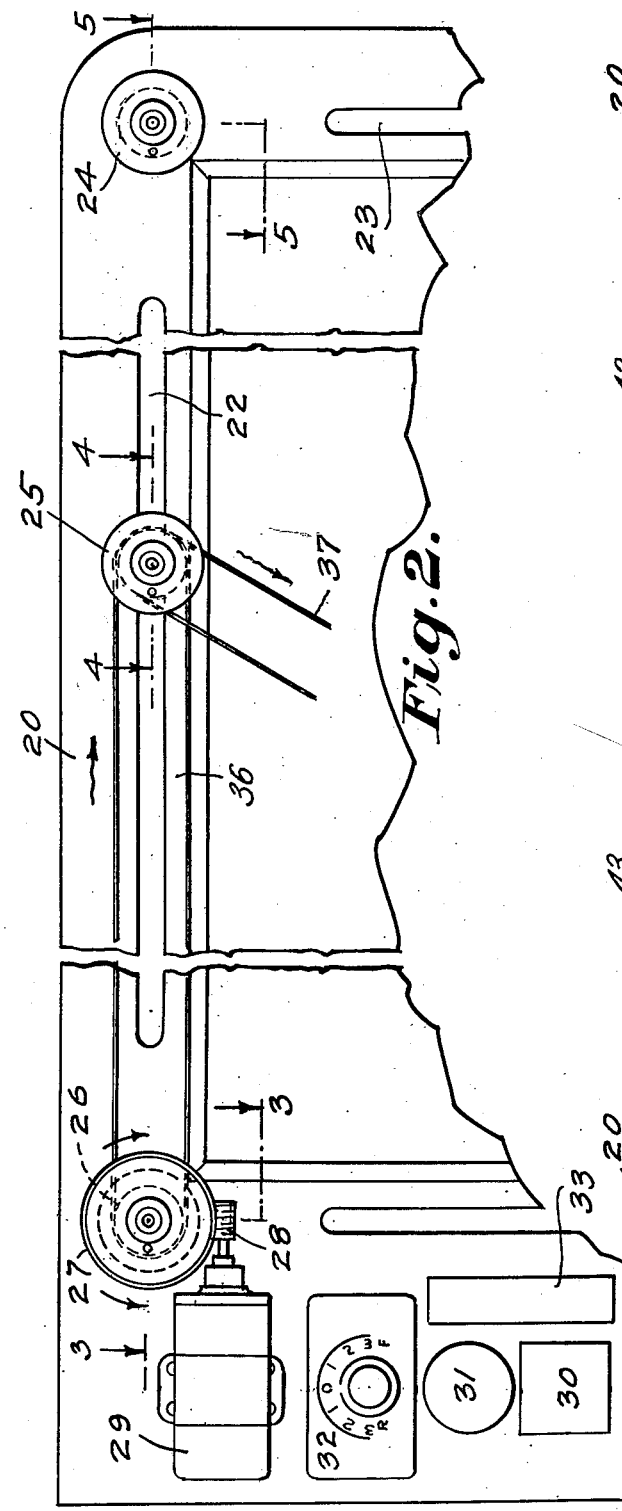
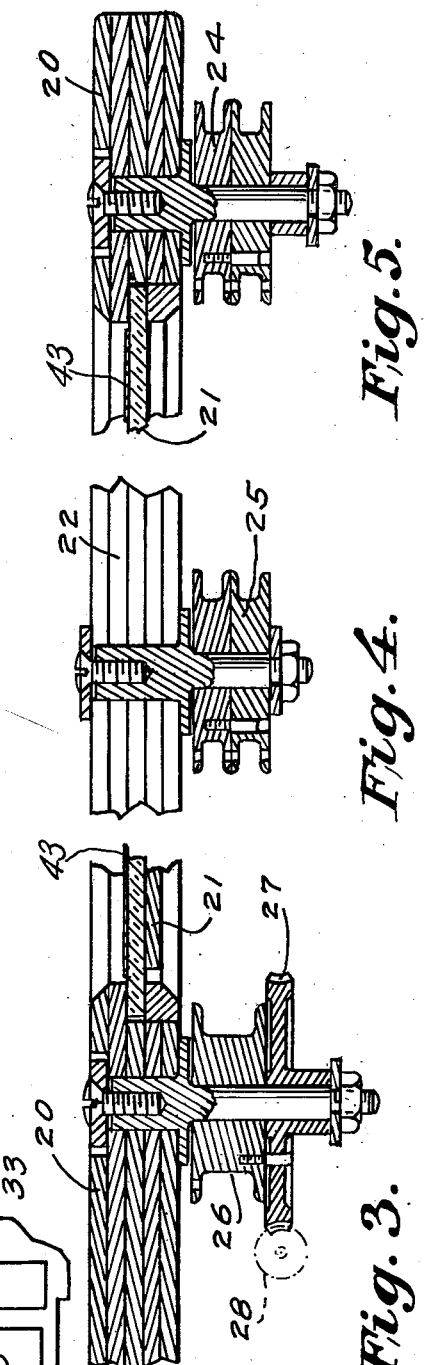
Fig.2.
Fig.5.
Fig.4.
Fig.3.
INVENTOR
EUGENE RHEINFRANK
BY
ATTORNEY Oct. 30, 1951     E. RHEINFRANK     2,573,490
DEMONSTRATOR
Filed April 28, 1950     6 Sheets-Sheet 3
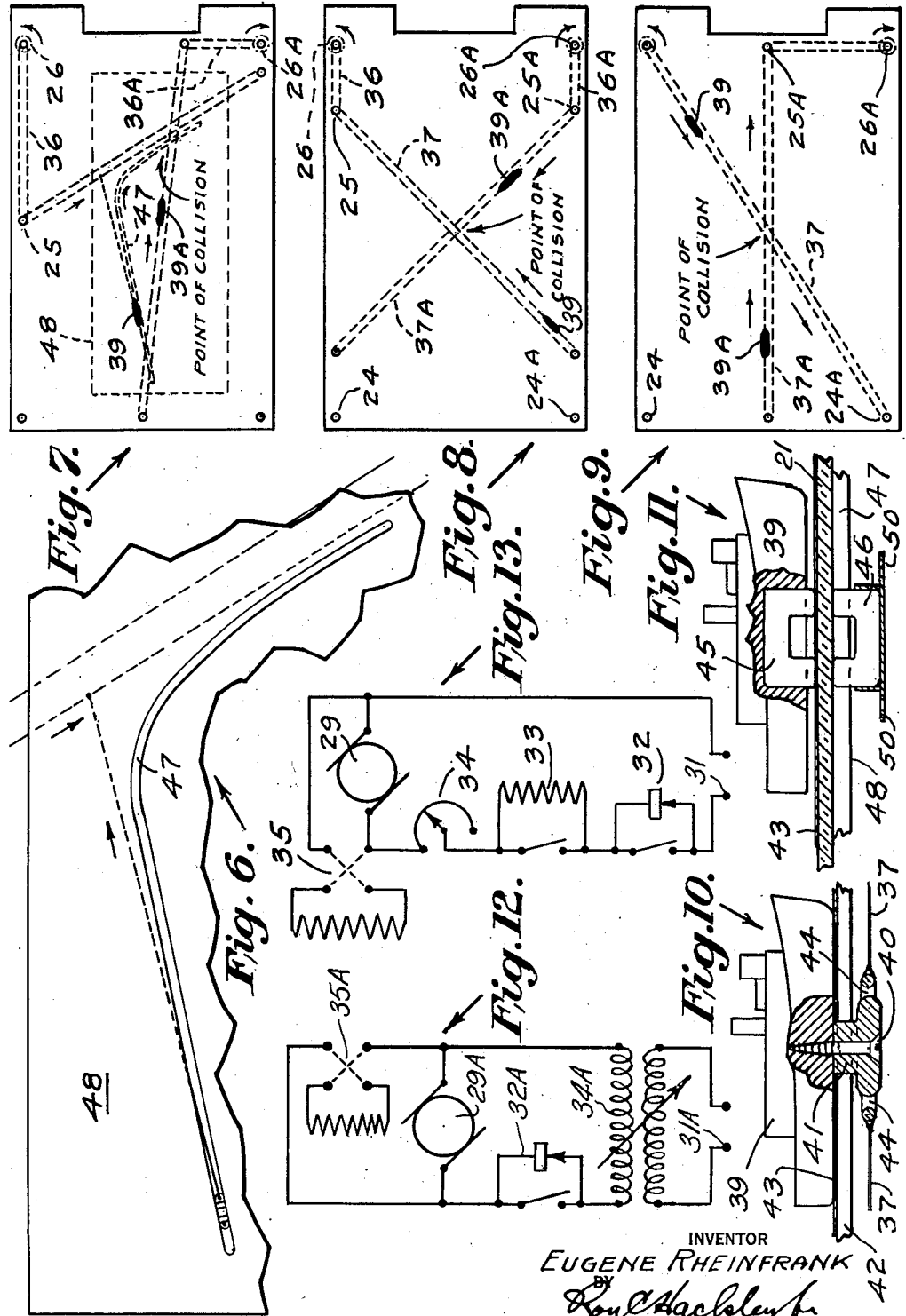
INVENTOR
EUGENE RHEINFRANK
BY
Roy C Hackley Jr
ATTORNEY

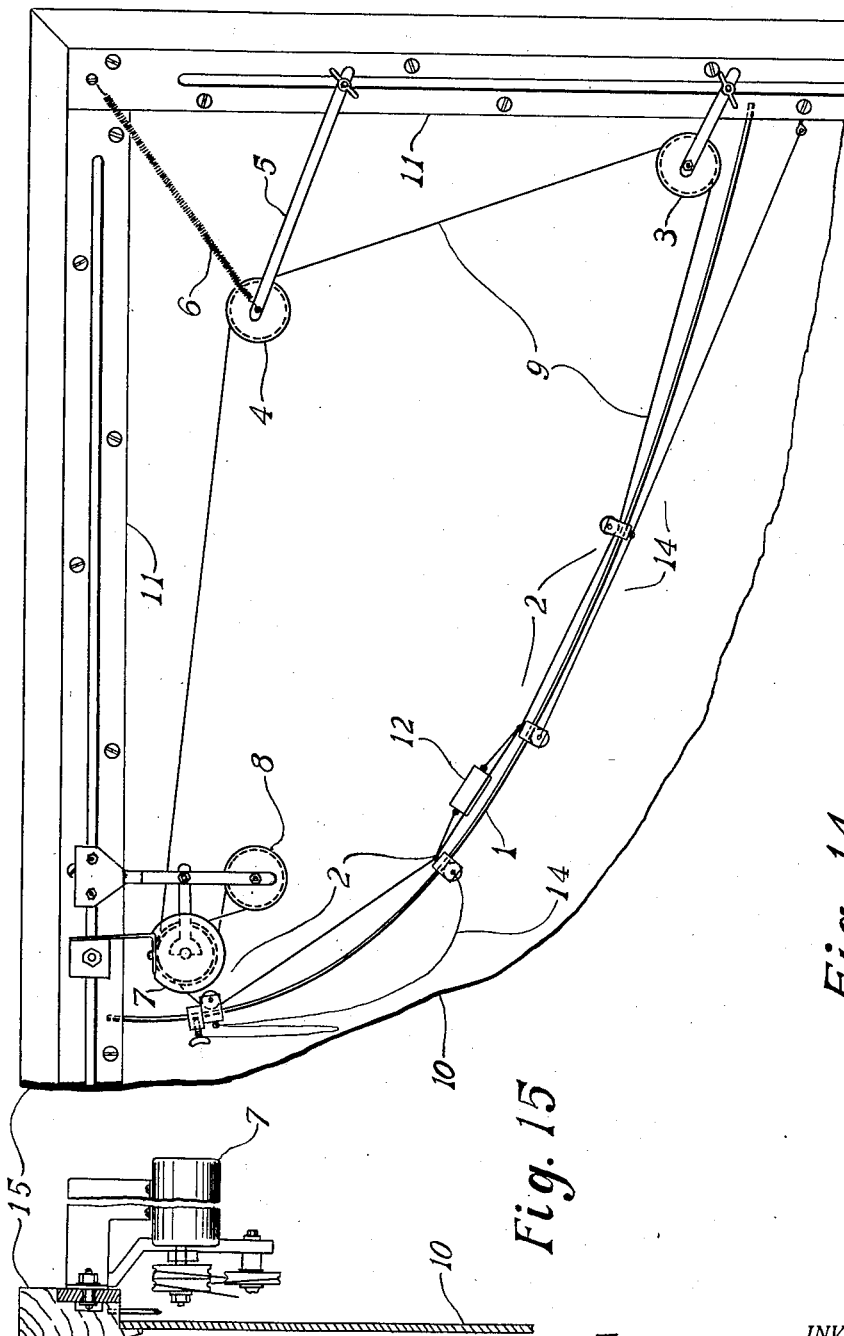

Oct. 30, 1951 E. RHEINFRANK 2,573,490
DEMONSTRATOR
Filed April 28, 1950 6 Sheets-Sheet 5

INVENTOR
EUGENE RHEINFRANK
BY
Roy C. Hackley Jr.
ATTORNEY

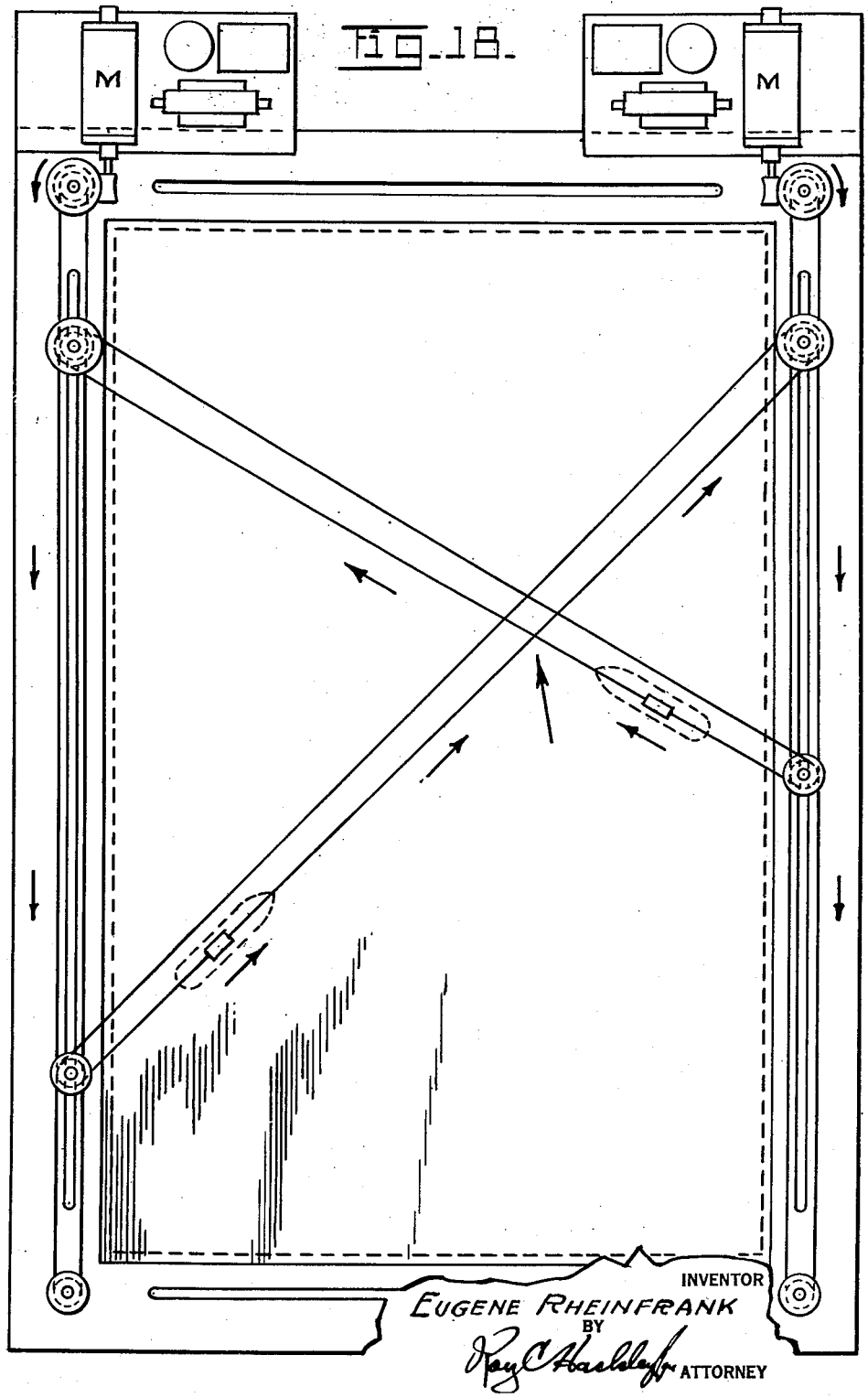

Patented Oct. 30, 1951

2,573,490

UNITED STATES PATENT OFFICE 2,573,490

DEMONSTRATOR

Eugene Rheinfrank, New York, N. Y.

Application April 28, 1950, Serial No. 158,877

2 Claims. (Cl. 35—11)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This application is a continuation in part of my application for a patent for a "Demonstrator," now abandoned, which was filed April 1, 1949, and received the Serial Number 85,011.

My invention may be used with models of ships, boats, motor vehicles or aircraft to demonstrate the courses followed immediately prior to a colliding, by each of the craft involved.

In the accompanying drawings which illustrate embodiments of my invention:

Figure 2 is a bottom plan view, partly broken away, of the device illustrated in Figure 1.

Figure 3 is a section on the line 3—3 of Figure 2.

Figure 4 is a section on the line 4—4 of Figure 2.

Figure 5 is a section on the line 5—5 of Figure 2.

Figure 6 is a fragmentary plan of a member having a course directing slot therein.

Figures 7, 8, and 9 are smaller scale diagrams illustrating the simulation of the movements of ships following intersecting courses.

Figure 10 is an elevation, partly in section, showing a model with an attached slide which slide is arranged to follow a slot cut through a map and a supporting sheet, with two attached cords for pulling the model in opposite directions.

Figure 11 illustrates a further modification which relies upon the magnetic attraction of a "horseshoe" magnet, through an insulating supporting sheet, for a model which includes a companion magnet.

Figure 12 is a wiring diagram of one form of model operating mechanism.

Figure 13 is a wiring diagram of an alternative model operating mechanism.

Figure 14 is a fragmentary bottom view of a modification of my operating means in which the course of a movable magnet is controlled by a flexible rod.

Figure 15 is a detail of a portion of Figure 14 on a larger scale.

Figure 16:
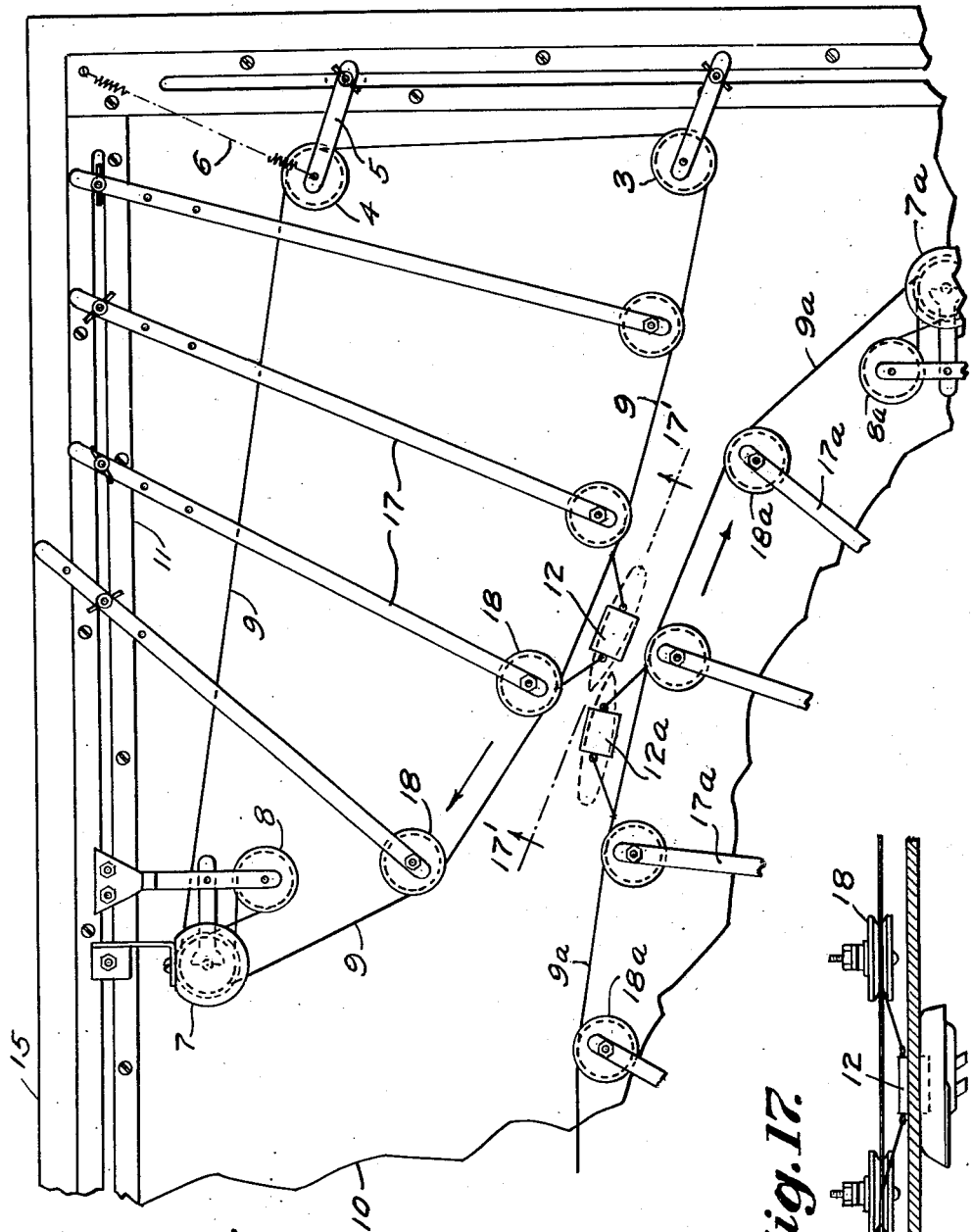

Figure 16 is a further modification of the embodiment of my device shown in Figure 15.

Figure 17:
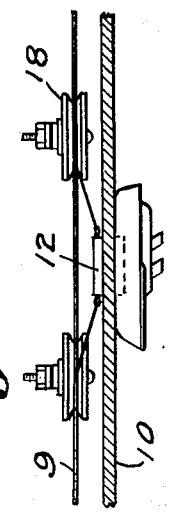

Figure 17 is a fragmentary section on the line 17'—17' of Figure 16.

Figure 18 is a bottom plan view of an embodiment of my device which is diagrammatically shown in Figure 8.

Figure 1:
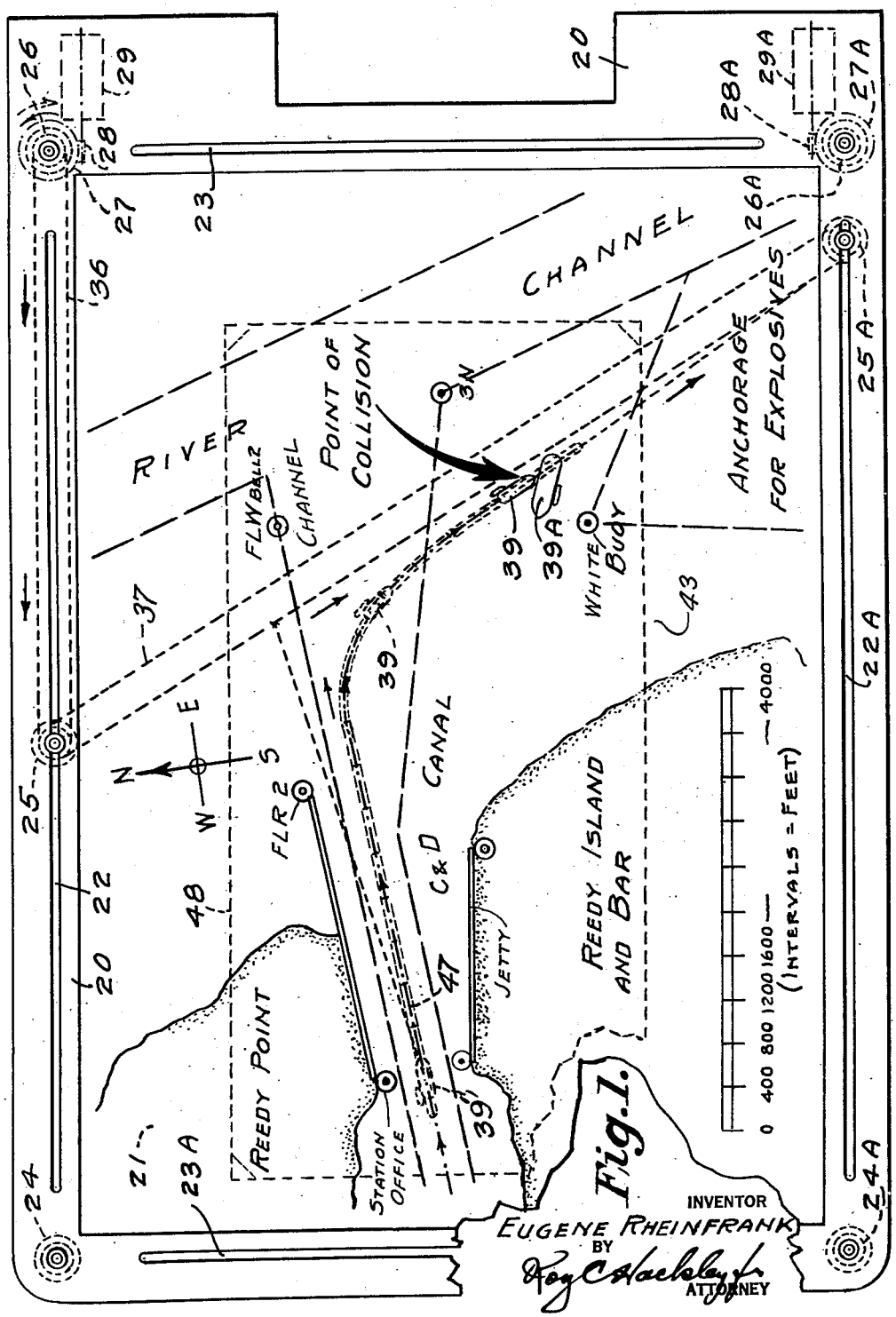
Figure 1 is a plan view of one form of my device upon which is mounted a map of the site of a collision including the courses followed by all craft involved.

In Figures 1 to 5 is shown the complete assembly of elements comprising one form of my invention. Figure 1 is a plan view of the upper side of the device. Figure 2 is a partial plan view of the bottom side of the device of Figure 1, and Figures 3 to 5 are more detailed views of the pulleys used in the device. In each of these Figures 1 to 5, the like numerals indicate the same parts in each figure, and numerals suffixed with an A indicate duplicate like parts.

In these Figures 1 to 5 is shown a frame 20 having a central opening in which a thin nonmagnetic supporting sheet 21 is mounted. This sheet 21, as shown in Figure 1, supports a map or the like 43, the map being used to show the location of a collision to be simulated. The frame 20 is provided with slots 22, 22A and 23, 23A and supports on its underside, as shown in Figure 2, two fixed double groove pulleys 25, 25A and two driving pulleys 26, 26A each of the latter being rigidly coupled with a worm gear 27, 27A which meshes with a worm gear 28, 28A on the shaft of an electric motor 29 or 29A as best shown in Figure 3.

In the embodiment of the invention shown in Figures 1 to 5, drive pulley 26 transmits power through endless belt 36 to a pulley 25 which is adjustable along slot 22. Pulleys 25 and 25A support an endless belt 37. To belt 37 is attached a model 39 by any suitable means. In the embodiment of Figure 1 the model 39 is attached to a line which is in turn suitably connected to belt 37. The model's path of travel is determined by groove 47 in the supplementary support plate 48 as shown in more detail in Figure 6. An additional model 39A may be moved in a similar manner by the use of pulleys of the nature of 25, 25A mounted in slots 23 and 23A as shown in Figure 7.

Each of Figures 8, 9, and 18 show various modifications of the courses of the models which may be utilized in the invention. In these figures the various like numeraled pulleys and belts correspond to those described in connection with Figure 1 above and, as shown, the directions of travel of the models are varied by varying the positions of pulleys such as 25 as shown in Figures 8 and 18 or by using pulleys 25 and 25A, and fixed pulleys such as 24, as shown in Figure 9.

The model may be attached to the belts 37 by various means. As shown in Figure 10, model 39 is detachably secured by a screw 40 to a slide 41 which extends through a slot 42 in sheet 21. If such a type model attachment is used, the course of the vessels is dependent upon the slot 42 which also appears then in map 43. The slide 41 is provided with ears 44 or the like to which is attached belt 37.

For use of the device without the requirement of a slot, as is preferred, the model is connected to the belt 37 as shown in Figure 11. In this form a magnet 45 is attached to model 39 and a second magnet 46 is attached to belt 37 by means of ears 50. As shown, the magnets are on either side of non-magnetic supporting sheet 21. The movement of magnet 46 by belt 37 will, by magnetic attraction, cause the model 39 to move.

Provision is made to drive the belt 37, 37A at any desired speed. Figures 12 and 13 show circuits which have been found suitable for the purpose. Referring to Figure 13, current is supplied from a suitable source of alternating current 31 to a rectifier 32 which supplies direct current through a resistance 33 and a speed controller 34 to a motor 29. A reversing switch 35 is provided for, at will reversing the direction of rotation of the motor 29 for reversing the direction of movement of the model. A similar control circuit is shown in Figure 12, the variation from Figure 13 being the use of a variable transformer 34A used to control the speed.

In Figures 14 and 15 the course of a model moving magnet 12 is controlled by a guide wire, rod or tube 1 of brass or other nonmagnetic metal upon which there are mounted a plurality of grooved pulleys 2.

A grooved pulley 3 is revolubly mounted on a link which is releasably clamped in a slot of one of two strips 11 which slot corresponds to the slots 23, 23A of Figure 1. A second grooved pulley 4 is similarly mounted on a link 5 and is similarly mounted in the same slot as the first of said links. To the end of the link 5 on which the pulley 4 is mounted there is attached a slack adjusting coiled spring 6 which spring is also fastened by a screw near an end of the strip 11.

An electric motor 7 is provided with a shaft upon which there is rigidly mounted a grooved driving pulley. The frame of the motor 7 is mounted on a bracket which is adjustably clamped in a second slotted strip 11, the latter being perpendicular to said first slotted strip. A grooved idler pulley 8 is mounted on a second bracket which in turn is adjustably clamped in the said slot in said second strip 11 corresponding to slot 22, 22A of Figure 1. An endless belt 9 is attached to each of the plurality of slides 2 and over the grooved pulleys 3, 4, 8 and a grooved pulley on the shaft of the motor 7. In this modification a model supporting sheet 10 is mounted in a rectangular frame 15 on which the slotted plates 11 are mounted.

In Figures 16 and 17 there is shown a modification of the embodiment of my invention shown in Figures 14 and 15. In this modification, wherein a plurality of models to be moved are shown, a plurality of adjustable arms 17, 17a each revolubly holding terminal grooved pulleys 18 and 18a respectively are releasably and adjustably mounted in the slotted plate 11, endless belts 9 and 9a pass over the grooved pulleys 3 and 3a (not shown); 4 and 4a (not shown); the pulleys on the shaft of motors 7 and 7a around 8 and 8a and over the plurality of pulleys 18 and 18a. The model moving magnets 12 and 12a may be attached to the belts 9 and 9a by two opposed tension members, as indicated in Figures 16 and 17. The flexible rod 1 shown in Figure 14 is eliminated from this modification, which depends upon adjustments of length and position with respect to the plate 11 for causing the belt 9 to follow a course simulating that which a ship has traveled immediately prior to colliding.

It may be clearly seen from a consideration of Figure 16 that a plurality of models may be moved to simulate the particular courses and particular speeds of vehicles involved in a collision. The courses and speeds may be accurately reproduced up to the time of the collision which is to be demonstrated by my device. The arms 17 and 17a are adjusted to show the particular converging courses of the vehicles and the motors 7 and 7a are run at speeds which will simulate those of the vehicles. In such a manner the converging courses and respective speeds of the vehicles up to the point of collision are clearly shown.

My device is particularly adapted to reproduce in miniature, the courses followed and relative speed of ships by the use of charts, drawn to scale, with the aid of scaled miniature models of the craft involved in a collision. Such demonstrations are of great value when used during the trials of damage suits in courts of admiralty. My device may also be used in teaching practical navigation and admiralty law, including the statutory rules of navigation. It will be helpful to assist students to comprehend and remember causes of many of the more common types of collisions which have occurred and to assist them in meeting emergency situations when navigating ships.

The charts used should include a scale of distances, the compass directions or rose, conventional markings showing channel markers, buoys, lights, lightships, lighthouses, piers, docks, vessels at anchor, the directions and speeds of currents and wind.

When my device is used for demonstrating collisions of land vehicles, a map of the scene should be used showing all curb lines, traffic signals and signs, the location of buildings, street excavations and any other obstructions to the vision or the normal flow of land traffic.

Similarly when used for demonstrating collisions of aircraft at or near an airport, a map should be used showing the location of runways, signal towers, transmission lines, tall buildings and chimneys, the direction and speed of the wind at the time of the accident, and the direction of any radio guiding beam.

It should be understood that the present disclosure is for the purpose of illustration only and that the invention includes all modifications and equivalents which fall within the scope of the appended claims.

What I claim is:

1. A device for simulating the movements of vehicles involved in a collision which comprises a frame having slots therein, a plurality of arms adjustably attached to said frame by means of a member which is capable of sliding in said slots and which member is also capable of fixing the arm in a rigid position, a terminal grooved pulley carried by each arm, a plurality of motors carried by said frame, a drive pulley connected to each motor, a plurality of endless belts, each belt defining a curved circuit by passing over a plurality of terminal grooved pulley wheels carried by the arms and also over the drive pulley of a motor, a plurality of magnets, each attached to one of said belts by means of two opposed filaments, a nonmagnetic surface extending across and bounded by one surface of said frame, and a plurality of vehicle models having magnets embedded therein and adapted to ride on said surface, whereby the adjustable arms may be set to arrange the endless belts in a course to be simulated, the motors may be run at a speed to be simulated and hence the moving magnets attached to the endless belts will move the models on the nonmagnetic surface to simulate the courses and speeds of vehicles prior to their collision.

2. A device for simulating the movements of vehicles involved in a collision which comprises a frame having slots around its periphery, a plurality of arms adjustably attached to said frame by bolts whereby the head of the bolt slides in said slots, a terminal grooved pulley carried by each arm, a plurality of tensioning springs each connecting a tensioning arm and the frame, a plurality of motors carried by said frame, a drive pulley attached to the shaft of each motor, speed control means attached to each motor, a plurality of endless belts, each belt defining a curved circuit by passing over a plurality of the grooved pulley wheels carried by fixed arms and a grooved pulley wheel carried by a tensioning arm and the drive pulley of a motor, a plurality of magnets each attached to one of said endless belts by means of two opposed filaments, a nonmagnetic sheet extending across and bounded by the perimeter of said frame, a map on the upper surface of said sheet, and a plurality of vehicle models having magnets embedded therein and adapted to ride on said surface, whereby a plurality of adjustable arms may be set to arrange each endless belt in a course to be simulated which courses do not cross but converge at the point of collision to be simulated, the motors may be run at a speed to be simulated and hence the moving magnets attached to the endless belts will move the models on the map surface to simulate the courses and speeds of the vehicles prior to and up to the point of their collision.

EUGENE RHEINFRANK.

REFERENCES CITED

The following references are of record in the file of this patent:

UNITED STATES PATENTS

| Number | Name | Date |
| --- | --- | --- |
| 2,239,395 | Mallory | Apr. 22, 1941 |
| 2,254,810 | Will | Sept. 2, 1941 |
| 2,400,149 | Immerman | May 14, 1946 |
| 2,486,273 | Gibson | Oct. 25, 1949 |

FOREIGN PATENTS

| Number | Country | Date |
| --- | --- | --- |
| 449,781 | Great Britain | July 3, 1936 |
| 137,708 | Austria | May 25, 1934 |